July 29, 1941.  L. H. GARLINGHOUSE  2,250,797

WHEELBARROW WHEEL MOUNTING

Filed May 13, 1940  2 Sheets-Sheet 1

INVENTOR.
L. H. GARLINGHOUSE
BY
ATTORNEYS

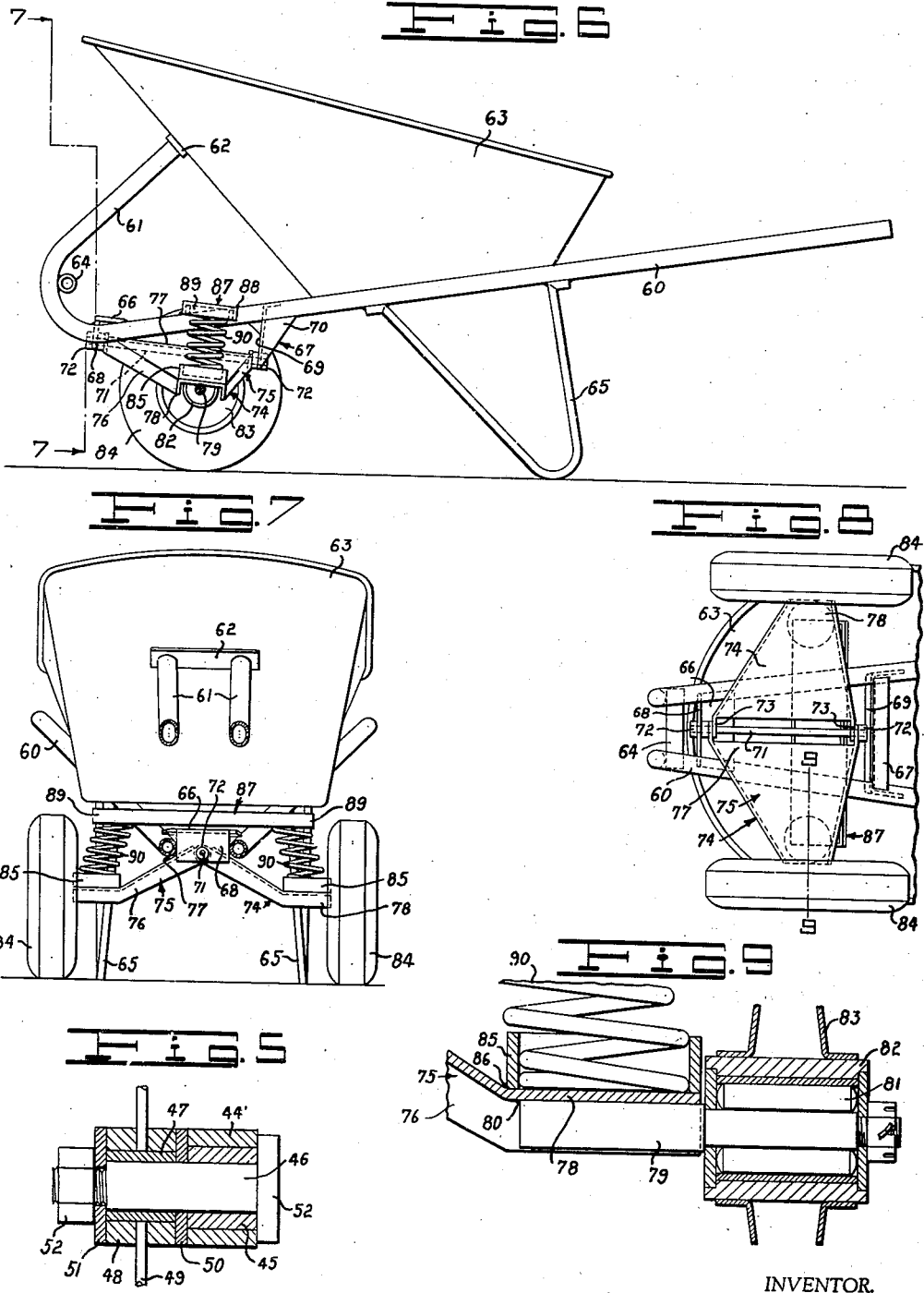

Patented July 29, 1941

2,250,797

UNITED STATES PATENT OFFICE 2,250,797

WHEELBARROW WHEEL MOUNTING

Leslie H. Garlinghouse, Los Angeles, Calif.

Application May 13, 1940, Serial No. 334,826

1 Claim. (Cl. 280—52)

This invention relates to wheelbarrow wheel mounting.

The general object of the invention is to provide a novel, sturdy wheelbarrow which can be operated by a worker with a minimum of labor and effort.

A more specific object of the invention is to provide a novel chassis for a wheelbarrow.

A further object of the invention is to provide a wheelbarrow including a chassis having a novel spring cushioned wheel mounting thereon.

Another object of the invention is to provide a wheelbarrow including a chassis including a novel support for a body.

Other objects and the advantages of my invention will be apparent from the following description taken in connection with the accompanying drawings, wherein:

Fig. 5 is a section taken on line 5—5, Fig. 4;

Fig. 6 is a side elevation showing a further modification;

Fig. 7 is a section taken on line 7—7, Fig. 6;

Fig. 8 is a fragmentary bottom plan view of the further modification; and

Fig. 9 is a section taken on line 9—9, Fig. 8.

Figure 1:
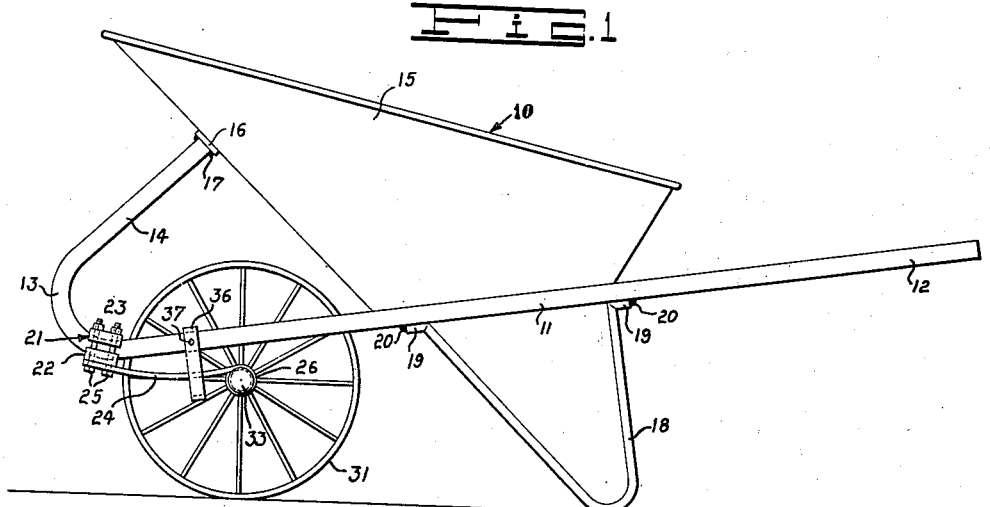
Fig. 1 is a side elevation of a wheelbarrow embodying the features of my invention.

Referring to the drawings by reference characters I have shown my invention as embodied in a wheelbarrow which is indicated generally at 10. As shown, the wheelbarrow 10 includes a pair of tubular metal side members 11 which have gripping portions 12 at one end and at the other end are joined by a curved portion 13 to a front member 14. The side members support a body 15 which has a brace 16 to which the front members are welded as at 17.

The wheelbarrow is supported by leg members 18 which are of general V-shaped and which are preferably inclined as shown in Fig. 1 and are secured in place by end portions 19 welded as at 20.

Figure 2:
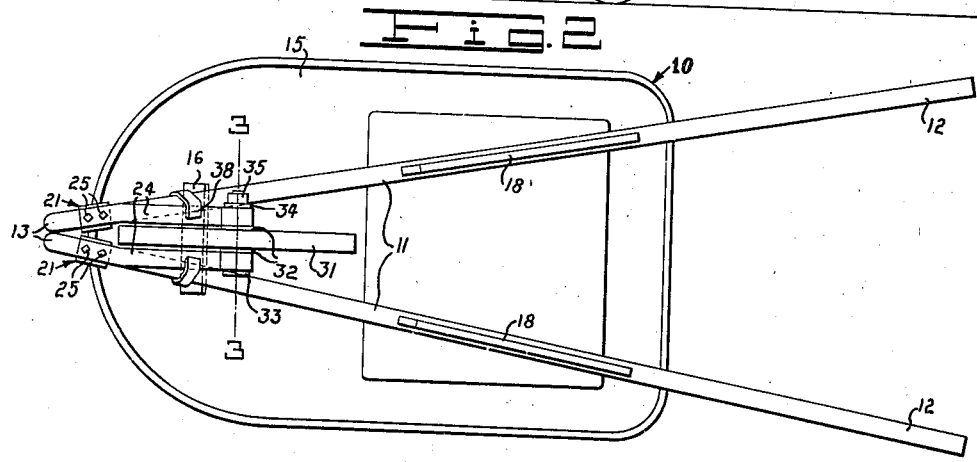
Fig. 2 is a bottom plan view of the wheelbarrow.

The side members converge toward the front of the wheelbarrow as shown in Fig. 2 and each side member adjacent the curved portion 13 is provided with a clip member indicated generally at 21 and which includes a lower clamping member 22 which engages the lower surface of the side member 11 and an upper clamping member 23 which engages the upper surface thereof. The lower clamping member is engaged by the end of a leaf spring 24. The clamping members 22 and 23 and the leaf spring 24 are provided with aligned apertures which receive bolts 25 to hold the parts assembled.

Figure 3:
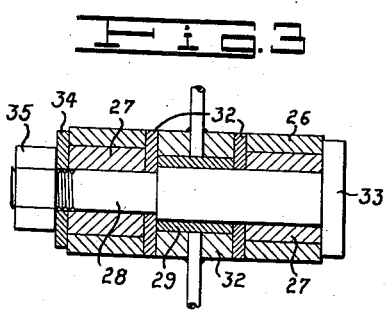
Fig. 3 is a section taken on line 3—3, Fig. 2.

The ends of the springs 24 remote from the clamping member 21 extend in parallel relation as shown in Fig. 2 and each is provided with an end portion 26 which is of general cylindrical shape and which receives a bearing 27 (see Fig. 3). The bearings 27 each support an axle 28 which has a bearing 29 thereon supporting the hub 30 of a wheel 31 shown as a metal tired wheel. Suitable spacing washers 32 are provided on the axle 28 and the axle is provided with a head portion 33 at one end and a washer 34 and a nut 35 at the other end.

With the construction disclosed a resilient cushion support is provided between the wheel 31 and the body supporting chassis so that blows and vibrations which occur when the wheel strikes an objection or irregularity is avoided.

In order to limit the movement of the free end of the spring 24 away from the side members 11, I provide each side member with an arm 36 which may be welded in place at 37. Each arm includes an end portion 38 (see Fig. 2) which is disposed in the path of movement of the free end of the spring 24.

In Figs. 1, 2, and 3 each of the side members with the front members thereof have their axes in a single plane and the free ends of the springs 24 are disposed so that the wheel 31 is disposed between the side members to provide a one wheel wheelbarrow.

Figure 4:
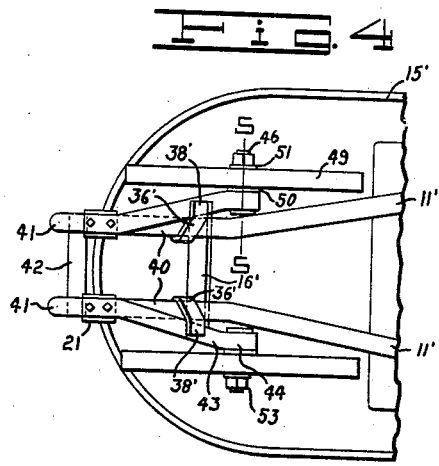
Fig. 4 is a fragmentary view similar to Fig. 2 showing a modification.

In order to supply a two wheel construction I show a modification in Figs. 4 and 5 wherein side members 11' support a body 15'. In the modification the side members 11' converge forwarded to the wheel location where they are bent to provide parallel portions 40 which are spaced apart and which at the forward ends are directed upwardly as at 41 being connected by a cross bar 42. The upwardly extending portions 41 are secured to a brace 16' on the body 15'.

Springs 24' are secured to each portion 40 by a clip member 21' similar to the clip member 21 previously described. The springs 24' include outwardly bent portions 43 and parallel extremities 44 which have cylindrical ends 44' (see Fig. 5). The ends 44' are each provided with a bushing 45 which support an axle 46 on which a bushing 47 is mounted. Each bushing 47 supports the hub 48 of a wheel structure 49. Suitable washers 50 and 51 are provided and the shaft 46 is held in place by a head 52 at one end and by a nut 53 at the other end.

In the modification arms 36' having end portions 38' similar to the arms 36 and ends 38 previously described are provided to limit the motion of the spring members 24'.

In the construction shown in Figs. 4 and 5 a resilient two wheel mounting by a vehicle chassis is provided.

In Figs. 6 to 9 inclusive I show a further modification of my invention wherein the wheelbarrow includes converging side members 60 with a front member 61 connected to a brace 62 on a body 63. The side members are connected by a cross member 64 and are supported by leg members 65.

The side members are further connected by a front cross bracket member 66 and a rear cross bracket member 67 suitably secured in place and which includes vertical portions 68 and 69. The bracket 67 each further includes a brace portion 70 which extends from the side member to the end of the bracket.

The bracket portions 68 and 69 support a shaft 71 which is shown as held in place by nuts 72. The shaft is arranged in apertured ears 73 on oppositely extending arm 74 to pivotally support the arms. The arms are similar and each includes a body portion 75 and edge flanges 76. Each arm includes an inner portion 77 which is normally inclined and a free end portion 78 which is normally substantially horizontal.

Mounted on each end portion 78 I show an axle 79 which may be welded in place as at 80. Each axle 79 supports a bearing 81 which in turn supports the hub 82 of a wheel 83 which may be a disk type wheel with a pneumatic tire 84 thereon.

The end 78 of each arm supports a spring seat 85 held in place by welding as at 86. A transverse member 87 is secured to the side members 60 as by welding at 88 and includes seat portions 89 at each end which are shown as disposed above and inwardly of the seat portions 85. A spring 90 engages each pair of seat portions and thus resiliently support the arms 75. When a tire strikes an obstruction the springs 90 will cushion the blow.

From the foregoing it will be apparent that I have invented a novel wheelbarrow wherein the body is resiliently mounted and wherein the construction is simple and the parts are readily assembled.

Having thus described my invention, I claim:

In a wheelbarrow, a chassis including a pair of elongated side members, said side members diverging towards the handle section and having parallel forward portions, a leaf spring mounted on the forward portion of each of the side members, each of said leaf springs including a forward end portion which extends parallel to the adjacent portion of the associated side member, said springs also including parallel portions at the rear end thereof, said springs diverging intermediate their ends whereby wheels carried on the rear end of the springs will clear the frame members, said rear portions of the springs terminating in hollow cylindrical portions, and a bearing for an axle mounted in each of the hollow cylindrical portions.

LESLIE H. GARLINGHOUSE.